US012325512B2

(12) United States Patent
Fink et al.

(10) Patent No.: US 12,325,512 B2
(45) Date of Patent: Jun. 10, 2025

(54) ROTORCRAFT WITH A NON-RETRACTABLE WHEEL-TYPE LANDING GEAR

(71) Applicant: AIRBUS HELICOPTERS DEUTSCHLAND GMBH, Donauworth (DE)

(72) Inventors: Axel Fink, Donauworth (DE); Reynaldo Oioli-Neto, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 18/509,696

(22) Filed: Nov. 15, 2023

(65) Prior Publication Data
US 2024/0294251 A1    Sep. 5, 2024

(30) Foreign Application Priority Data

Dec. 21, 2022  (EP) .................................... 22215343

(51) Int. Cl.
*B64C 25/36*    (2006.01)
*B64C 25/06*    (2006.01)
(Continued)

(52) U.S. Cl.
CPC .............. *B64C 25/36* (2013.01); *B64C 25/06* (2013.01); *B64C 25/58* (2013.01); *B64C 2025/325* (2013.01)

(58) Field of Classification Search
CPC ......... B64C 25/36; B64C 25/06; B64C 25/58; B64C 2025/325; B64C 25/34; B64C 25/60

See application file for complete search history.

(56) References Cited

U.S. PATENT DOCUMENTS

| 2,843,345 A | 7/1958 | Sikorsky |
| 3,128,971 A | 4/1964 | Daffer |

(Continued)

FOREIGN PATENT DOCUMENTS

| CN | 113716027 A | 11/2021 |
| CN | 113911322 A | 1/2022 |

(Continued)

OTHER PUBLICATIONS

European Search Report for European Application No. EP 22215343. 9, Completed by the European Patent Office, Dated May 9, 2023, 10 pages.

*Primary Examiner* — Valentina Xavier
(74) *Attorney, Agent, or Firm* — BROOKS KUSHMAN P.C.

(57) ABSTRACT

A rotorcraft comprising a fuselage forming at least one lower lateral fuselage compartment with at least a first fitting, a second fitting, and a third fitting; and at least one non-retractable wheel-type landing gear that comprises: at least one wheel; a shock absorber with a shock absorber tube having an open end and an axially opposed closed end, and a shock absorber rod telescopically mounted to the shock absorber tube via the open end; a first fixation provided close to the open end on the shock absorber tube and connected to the first fitting; a second fixation provided close to the closed end on the shock absorber tube and connected to the second fitting; and a third fixation provided close to the closed end on the shock absorber tube and connected to the third fitting.

20 Claims, 4 Drawing Sheets

(51) Int. Cl.
*B64C 25/58* (2006.01)
*B64C 25/32* (2006.01)

(56) References Cited

U.S. PATENT DOCUMENTS

| | | | |
|---|---|---|---|
| 3,547,425 A | | 12/1970 | Wachenheim |
| 3,954,232 A | | 5/1976 | Harper |
| 5,060,886 A | | 10/1991 | Davis et al. |
| 5,839,692 A | | 11/1998 | Ralph et al. |
| 8,523,106 B2 | * | 9/2013 | Thompson .............. B64C 25/14 |
| | | | 244/102 R |
| 11,319,060 B2 | * | 5/2022 | Cottet ....................... B64C 1/10 |
| 2009/0014582 A1 | | 1/2009 | De Ruffray et al. |
| 2016/0375979 A1 | | 12/2016 | Von-Wilmowsky et al. |
| 2019/0241256 A1 | * | 8/2019 | Moine ..................... B64C 25/14 |
| 2021/0039774 A1 | | 2/2021 | Isaac et al. |

FOREIGN PATENT DOCUMENTS

| | | |
|---|---|---|
| CN | 113955091 A | 1/2022 |
| CN | 114771810 A | 7/2022 |
| EP | 1951570 A1 | 8/2008 |
| EP | 3112254 A1 | 1/2017 |
| WO | 2007057401 A1 | 5/2007 |

\* cited by examiner

ROTORCRAFT WITH A NON-RETRACTABLE WHEEL-TYPE LANDING GEAR

CROSS-REFERENCE TO RELATED APPLICATIONS

This application claims priority to European patent application No. EP 22215343.9 filed on Dec. 21, 2022, the disclosure of which is incorporated in its entirety by reference herein.

TECHNICAL FIELD

The disclosure is related to a rotorcraft with a non-retractable wheel-type landing gear.

BACKGROUND

In general, rotorcrafts are either provided with retractable or partially retractable landing gears, or with fixed, i.e., non-retractable landing gears. Retractable or partially retractable landing gears are usually embodied as wheel-type landing gears, while fixed, i.e., non-retractable landing gears are usually embodied as both skid-type landing gears or wheel-type landing gears.

Use of either a wheel-type landing gear or a skid-type landing gear for a given rotorcraft mostly depends on a respective size and weight of the given rotorcraft. More particularly, wheel-type landing gears are usually implemented with larger, i.e., medium-to-heavy rotorcrafts in order to allow for an improved ground handling of such larger rotorcrafts, while smaller, i.e., light-to-medium rotorcrafts are usually implemented with skid-type landing gears.

More specifically, a wheel-type landing gear of a conventional rotorcraft may either have a so-called tricycle-type layout or, less frequently, a so-called quadricycle-type layout. The tricycle-type layout is intended to enable resting of a given rotorcraft on three separate landing gears and refers to a configuration with either a single nose-wheel landing gear or a single tail-wheel landing gear. The single nose-wheel landing gear configuration, which is currently most used, features a single landing gear provided in a nose fuselage section of a given rotorcraft and two main landing gears provided in a rear fuselage section of the given rotorcraft. The single tail-wheel landing gear configuration, instead, features a single landing gear provided in a tail section of a given rotorcraft and two main landing gears provided in a front section of the given rotorcraft. In both configurations, each one of the two main landing gears is positioned on a respectively associated lateral side of the given rotorcraft for providing sufficient stability on ground.

If a given wheel-type landing gear is retractable or partially retractable, its nose/tail and main landing gears are totally or partially housed in forward flight operation of a given rotorcraft within associated landing gear compartments in order to substantially reduce a respective aerodynamic drag of the given rotorcraft, hence, enabling an increased flight speed while reducing fuel consumption and allowing for larger flight ranges. However, in contrast to fixed-wing applications the associated landing gear compartments of the given rotorcraft are usually not closed by trap doors in the forward flight operation, since an improvement of the respective aerodynamic drag that would be associated with closed trap doors does not prevail over an additional weight of such trap doors and their associated kinematics.

Nevertheless, in any case a respectively required retraction capability of the given wheel-type landing gear already results in an increase of design complexity of the given wheel-type landing gear and its kinematics and requires a comparatively large storage volume either within the fuselage, hence, reducing available usable volume in the fuselage, or within a lateral protruding so-called sponson, hence, at least partially penalizing obtainable aerodynamic advantages of the respectively required retraction capability. Furthermore, a respective need for actuation, which is usually either electric or hydraulic, with its control and harnesses associated to retraction/expansion result in a weight increase of the given wheel-type landing gear and must be evaluated carefully against obtainable aerodynamic advantages.

However, as a general rule retractable or partially retractable wheel-type landing gears are deemed advantageous in terms of overall operational performance for fast rotorcrafts. Illustrative retractable or partially retractable wheel-type landing gears are described in the documents EP 1 951 570 A1, EP 3 112 254 A1, U.S. Pat. No. 3,954,232 A, and US 2021/0039774 A1.

Nevertheless, the simplicity and robustness, the compactness as well as the reduced weight of fixed, i.e., non-retractable wheel-type landing gears may lead to improved singular operational performances with larger useable volumes, larger payloads and less need for maintenance. Illustrative non-retractable wheel-type landing gears are described in the documents U.S. Pat. Nos. 2,843,345, 3,128,971, 3,547,425, and 5,060,886.

More specifically, an important requirement for fixed, i.e., non-retractable wheel-type landing gears is linked to an underlying attachment design which should be developed in a way to avoid the non-retractable wheel-type landing gear of being subjected to a respective overall elastic behavior of a given rotorcraft. This is especially the case with nose landing gears and main landing gears of non-retractable wheel-type landing gears, which are housed within an internal perimeter of the rotorcraft's fuselage rather than being installed within an external protruding sponson. However, respective attachment designs for such nose landing gears and main landing gears should be developed in a way to reduce as much as possible respective interface loads by ensuring an adequate basis for moment reactions and to ensure a good accessibility to respective fixation parts for inspection and disassembly in a repair scenario.

Usually, nose landing gears and main landing gears of non-retractable wheel-type landing gears comprise a shock absorber connected to one or more associated wheels, the shock absorber including a static shock absorber tube and a slidable shock absorber cylinder or rod which is telescopically mounted to the shock absorber tube. A conventional attachment design for attachment of such nose landing gears and main landing gears to a given rotorcraft involves clamping a respective shock absorber within a single interface plane to the given rotorcraft's fuselage or airframe structure by using at least three thick tension bolts. Other designs, especially for arrangements outside the fuselage perimeter of the given rotorcraft, feature a truss framework built up of a set of struts and beams.

SUMMARY

It is an object of the present disclosure to provide a new rotorcraft with an improved fixed, i.e., non-retractable wheel-type landing gear and, more particularly, with a main landing gear that provides for an improved weight efficiency and a decreased required installation volume in the new rotorcraft. Furthermore, the improved fixed, i.e., non-retractable wheel-type landing gear and, more particularly, main landing gear should be suitable for providing in the new rotorcraft improved reaction load paths into an associated fuselage of the new rotorcraft which should be provided with simplified exchangeable attachment fittings which allow a comparatively good accessibility to respective fixations of the improved fixed, i.e., non-retractable wheel-type landing gear and, more particularly, main landing gear.

This object is solved by a rotorcraft with a non-retractable wheel-type landing gear. More specifically, the rotorcraft comprises a fuselage and at least one non-retractable wheel-type landing gear. The fuselage forms at least one lower lateral fuselage compartment with an opening, wherein the at least one lower lateral fuselage compartment comprises at least a first fitting, a second fitting, and a third fitting. The at least one non-retractable wheel-type landing gear is rigidly attached in the at least one lower lateral fuselage compartment and extends at least partly through the opening. The at least one non-retractable wheel-type landing gear comprises at least one wheel; a shock absorber with a length axis and a circumferential direction, the shock absorber being connected to the at least one wheel and including a shock absorber tube with a length direction, which comprises in the length direction an open end and an axially opposed closed end; and a shock absorber rod telescopically mounted to the shock absorber tube via the open end; a first fixation provided close to the open end on the shock absorber tube and connected to the first fitting; a second fixation provided close to the closed end on the shock absorber tube and connected to the second fitting; and a third fixation provided close to the closed end on the shock absorber tube and connected to the third fitting, wherein the third fixation is spaced apart from the second fixation in the circumferential direction of the shock absorber by a predetermined angle.

Preferably, the non-retractable wheel-type landing gear of the new rotorcraft, which is rigidly attached in the lower lateral fuselage compartment of the rotorcraft, extends essentially outward and through the associated opening of the lower lateral fuselage compartment. Thus, an excellent accessibility to all components of the non-retractable wheel-type landing gear in the lower lateral fuselage compartment may be guaranteed. Furthermore, a comparatively compact design of the non-retractable wheel-type landing gear enables minimization of a required housing volume within the lateral inner fuselage or airframe perimeter of the new rotorcraft, as well as minimization of a respective shell cut-out required for landing gear integration, thus, leading to an increase of useable volume within the fuselage or airframe of the new rotorcraft.

Advantageously, the non-retractable wheel-type landing gear of the new rotorcraft exhibits an improved design and attachment principle which is particularly, but not exclusively, suitable for application to a main landing gear of the rotorcraft. The improved design and attachment principle provides for an easy substantiation of each attachment point and associated attachment elements, such as lugs and fittings, due to functional separation, as well as for an improved exchangeability of the fittings in case of damage and required exchange. Furthermore, the improved design and attachment principle provides for overall isostatic characteristics in order to avoid the non-retractable wheel-type landing gear being subjected to an overall elastic behavior of the new rotorcraft, and to allow for a tolerance-free landing gear integration.

In the new rotorcraft, the at least one non-retractable wheel-type landing gear outstands by its overall simplicity with a compact, simple and light weight shock absorber. The shock absorber is essentially composed of the shock absorber rod and the shock absorber tube with the preferably integrally formed and laterally extending first, second, and third fixations. More particularly, the shock absorber enables attachment at two different attachment levels: a first or upper attachment level located on the uppermost extremity of the shock absorber tube, and a second or lower attachment level located in the lower region of the shock absorber tube. Accordingly, the shock absorber tube of the shock absorber forms a fixed, i.e., static attached part of the shock absorber and the shock absorber rod forms a movable part that may travel in the shock absorber tube during stroke. During such a travel, the shock absorber rod is preferably axially stabilized by means of an associated torque link.

Preferably, at the upper attachment level laterally extending mounting arms are provided which implement an upper main hinge in the new rotorcraft. More specifically, the laterally extending mounting arms may extend from an upper side of the shock absorber tube and implement two upper tube fixation points at the second and third fixations, which are spaced apart from each other such that a trunnion axis is defined which represents a rotation axis about which the at least one non-retractable wheel-type landing gear may rotate if not being blocked. This rotation is, however, blocked at the lower attachment level by a lower tube fixation point formed by the first fixation, which is allocated at the lower end of the shock absorber tube, and which preferably represents a lug connection with a single bolt.

More specifically, at the lower attachment level a comparatively short drag link may be provided and attached to the first fixation which forms the lower tube fixation point and preferably interconnects to a drag link fitting which is fixed to a lower side portion of the quarter shell of the fuselage of the new rotorcraft. The drag link fitting forms the first fitting. Hence, the drag link represents a longitudinal element with two fixation end points, one first fixation end point being attached at the lower tube fixation point formed by the first fixation, and one second fixation end point being attached to the first fitting. The first and second fixation end points of the drag link may respectively incorporate a spherical bearing. Alternatively, the spherical bearings may be installed within the first fixation and the first fitting.

Preferably, an action line is defined by the drag link between the first and second fixation end points. Furthermore, the lower tube fixation point is preferably positioned on a first perpendicular geometrical line, which intersects the trunnion axis formed by the two upper tube fixation points at the second and third fixations on a first intersection point and is perpendicular to the trunnion axis. Moreover, a second perpendicular geometrical line preferably extends from the first fixation end point perpendicular to both the first perpendicular geometrical line and the trunnion axis. This second perpendicular geometrical line is preferentially coincident to the action line defined by the drag link.

In other words, the upper attachment level is located in the new rotorcraft close to the cabin floor, whereas the lower attachment level is located close to the lower shell. Accordingly, in the given rotorcraft the upper and lower attachment levels are advantageously spaced apart over a largest available spanning distance in a respective subfloor region to react moments about a lateral or transverse axis of the new rotorcraft, which are associated to the most demanding load cases arising from large longitudinal and transverse wheel contact loads. The spanning distance is limited by the distance between the lower shell of the fuselage or airframe of the new rotorcraft and a respective floor level of the cabin floor within the fuselage or airframe. In other words, the spanning distance—the basis—results from a respective distance between the trunnion axis and the drag link, and maximizing the basis leads to a reduction of respective interface loads and to an increase of a provided landing gear stiffness.

More specifically, the drag link is preferably essentially oriented horizontally perpendicular to the shock absorber and located ahead of the shock absorber tube in the new rotorcraft. Hence, the interface loads may be kept to a minimum. The drag link, which is preferably attached to a lower portion of the fuselage shell of the new rotorcraft and, more particularly, to the quarter shell, is arranged more or less tangential to the latter. Hence, the longitudinal load of the drag link is transferred by shear into the quarter shell without generating secondary transverse loading on the quarter shell. Preferably, the drag link load is transmitted to the quarter shell by means of the first fitting, i.e., a respective drag link fitting. A small parasitic kick moment associated to a given offset between the drag link and the quarter shell may be reacted by an interconnection of the drag link fitting to two fuselage frames allocated in a lower region of the fuselage of the new rotorcraft.

Advantageously, the drag link may be oriented in a most stiff and efficient way targeting a reduction of the risk of kinematic instability of the drag link. Kinematic instability is associated to short links and refers to a non-linear phenomenon at which a small initial misalignment of a given short link steadily increases with rising applied load. This effect is critical at excessive initial misalignments and small effective rigidities of the main landing gear, its attachments and the airframe sections within the main landing gear perimeter.

According to some preferred embodiments, the at least one lower lateral fuselage compartment comprises a main fitting that forms the second fitting and the third fitting.

According to some preferred embodiments, the second fixation and the third fixation are connected to each other via a supporting axle, wherein the supporting axle is connected to the second fitting and the third fitting such that the supporting axle forms a main hinge axis.

The second fixation may comprise a first mounting arm connected to the shock absorber tube, wherein the first mounting arm is integrally formed with the shock absorber tube and comprises a first bearing lug that supports the supporting axle.

The third fixation may comprise a second mounting arm connected to the shock absorber tube, wherein the second mounting arm is integrally formed with the shock absorber tube and comprises a second bearing lug that supports the supporting axle.

The first fixation may form a hinge axis that is inclined with respect to the main hinge axis.

According to some preferred embodiments, the first fixation is integrally formed with the shock absorber tube and attached to a linear link component that links the shock absorber tube to the first fitting.

The first fixation and the main hinge axis may be connected via at least one geometrical connecting line that is perpendicular to the main hinge axis.

The at least one geometrical connecting line may intersect the main hinge axis at an associated intersection point.

The linear link component may form an action line that is perpendicular to the at least one geometrical connecting line.

The action line may be perpendicular to the main hinge axis.

Preferably, the fuselage comprises a side shell that transitions via a quarter shell into a lower shell, wherein the action line is arranged tangential to the quarter shell.

The linear link component has a length which may be smaller than a predetermined distance between the second fitting and the third fitting.

Preferably, the fuselage comprises a side shell that transitions via a quarter shell into a lower shell, wherein the first fitting is attached to, or integrally formed with, the quarter shell.

According to some preferred embodiments, the first fixation forms a first link fixation point and the first fitting forms a second link fixation point. The first link fixation point may be equipped with a first spherical bearing and the second link fixation point may be equipped with a second spherical bearing.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
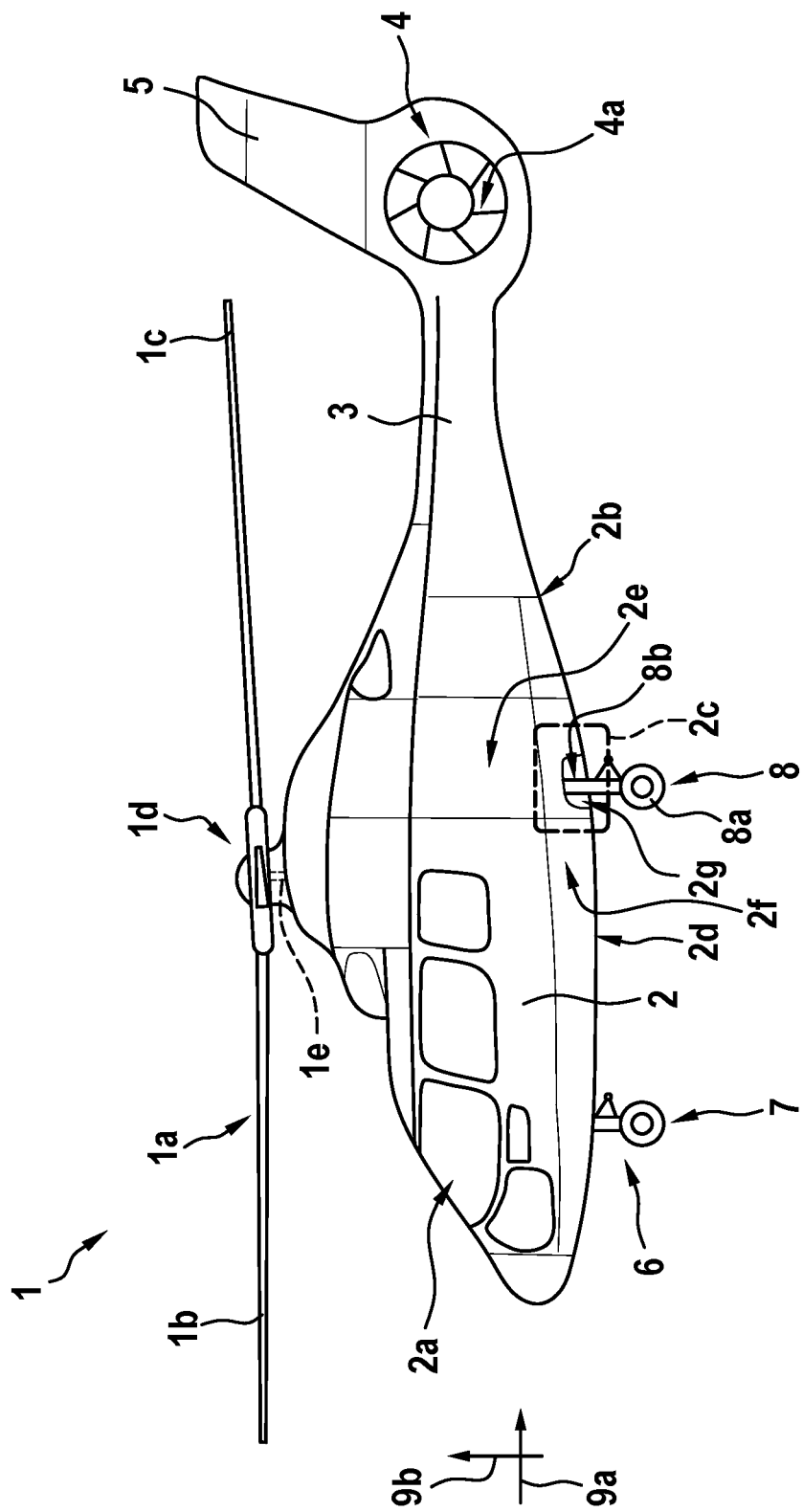
FIG. 1 shows a lateral view of a rotorcraft with at least one non-retractable wheel-type landing gear.

FIG. 1 shows a rotorcraft 1 that is exemplarily illustrated as a helicopter. Thus, for purposes of simplicity and clarity, the rotorcraft 1 is hereinafter referred to as the "helicopter 1".

Illustratively, the helicopter 1 comprises at least one main rotor 1a for providing lift and forward or backward thrust during operation. By way of example, the at least one main rotor 1a is embodied as a multi-blade main rotor that comprises a plurality of rotor blades 1b, 1c which are mounted at an associated rotor head 1d to a rotor shaft 1e, which rotates in operation of the helicopter 1 around an associated rotor axis.

The helicopter 1 further comprises a fuselage 2 on top of which the at least one main rotor 1a is located. Illustratively, the fuselage 2 forms a cabin 2a with a cabin floor (17 e.g., in FIG. 2), and a rear fuselage 2b. The fuselage 2 extends in a longitudinal direction 9a that corresponds in the three-dimensional space to an x-axis, a vertical direction 9b that corresponds in the three-dimensional space to a z-axis, and a transverse direction (9c e.g., in FIG. 2) that corresponds in the three-dimensional space to a y-axis. The fuselage 2 is connected at the rear fuselage 2b to a tail boom 3. By way of example, the helicopter 1 further comprises at least one preferentially shrouded counter-torque device 4 which is located on the tail boom 3 and configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

More specifically, the fuselage 2 comprises at least a lower shell 2d, a quarter shell 2f, a side shell 2e, and at least one lateral longeron (18 e.g., in FIG. 2) which together delimit at least one lower lateral fuselage compartment 2c with an opening 2g through which the at least one lower lateral fuselage compartment 2c is accessible. The lower shell 2d illustratively transitions via the quarter shell 2f into the side shell 2e and encases together with the latter the cabin floor (17 e.g., in FIG. 2).

Illustratively, the fuselage 2 is connected to a wheel-type landing gear 6 that comprises at least one fixed, i.e., non-retractable wheel-type landing gear 8 rigidly attached in the at least one lower lateral fuselage compartment 2c and extending at least partly through the opening 2g. The at least one fixed, i.e., non-retractable wheel-type landing gear 8 comprises at least one wheel 8a, illustratively a single wheel, and a shock absorber 8b connected to the wheel 8a.

By way of example, the wheel-type landing gear 6 has a tricycle-type layout in which the at least one non-retractable wheel-type landing gear 8 implements two similarly constructed rear main landing gears. Thus, the at least one non-retractable wheel-type landing gear 8 is also referred to hereinafter as "the main landing gear 8" and described in more detail with respect to only one of the two similarly constructed rear main landing gears, for simplicity and brevity. Illustratively, the wheel-type landing gear 6 with the tricycle-type layout further comprises a single fixed, i.e., non-retractable nose landing gear 7.

Figure 2:
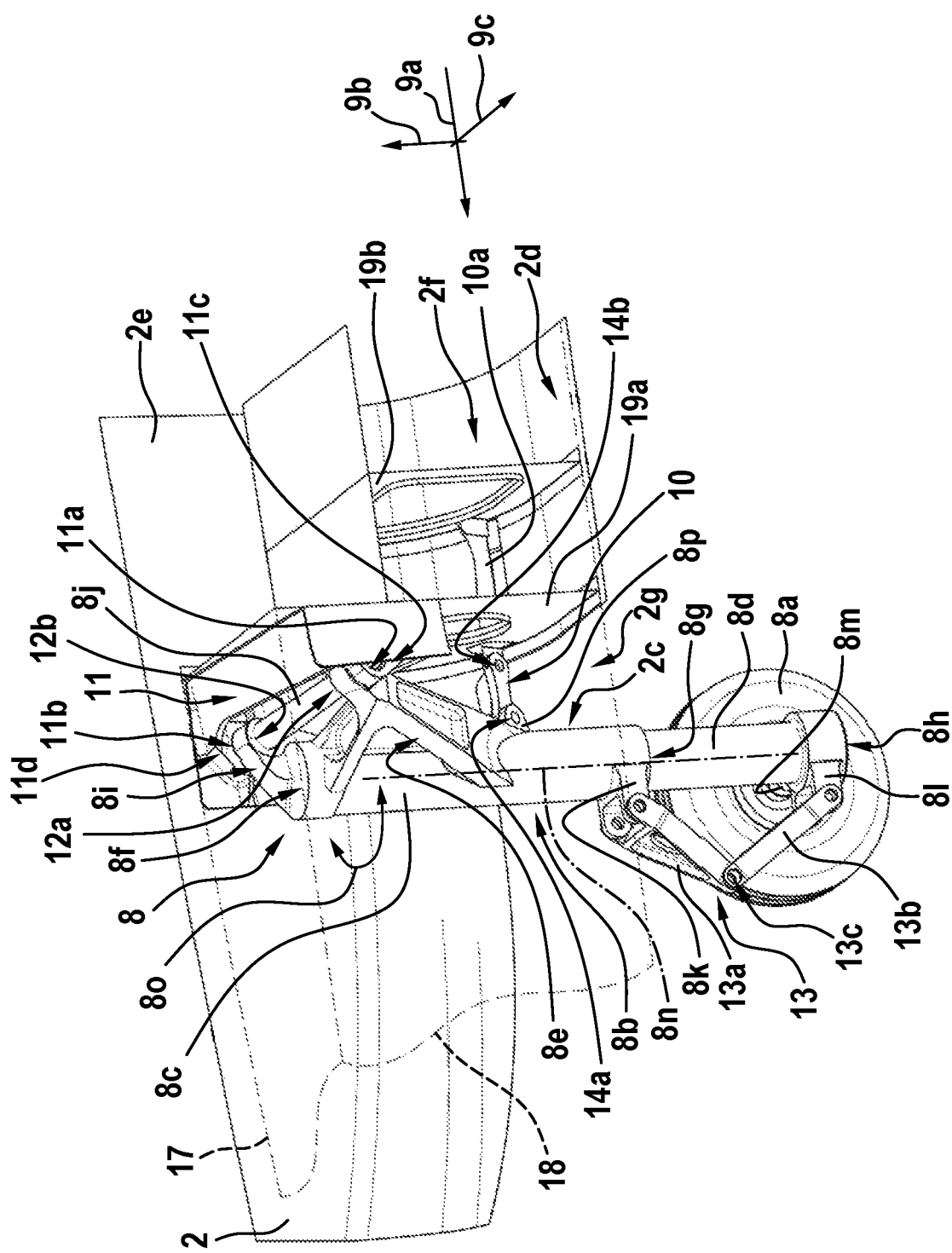
FIG. 2 shows a perspective view of a part of the fuselage of FIG. 1, as well as the at least one non-retractable wheel-type landing gear of FIG. 1 with a shock absorber in extended state, seen from an inner rear side.

FIG. 2 shows the main landing gear 8 of FIG. 1 with the single wheel 8a and the shock absorber 8b, as well as a portion of the fuselage 2 of FIG. 1 with the lower shell 2d, the side shell 2e, and the quarter shell 2f. The main landing gear 8 is rigidly attached in the at least one lower lateral fuselage compartment 2c of FIG. 1 and extends at least partly through the opening 2g. Furthermore, the longitudinal direction 9a, the vertical direction 9b, as well as a transverse direction 9c of the fuselage 2 of FIG. 1 are indicated and applied in analogy to the main landing gear 8.

As described above at FIG. 1, the shock absorber 8b is connected to the single wheel 8a. More specifically, the shock absorber 8b has a length axis 8n and a circumferential direction 8o and comprises a shock absorber tube 8c as well as a shock absorber rod 8d telescopically mounted to the shock absorber tube 8c. Illustratively, the shock absorber tube 8c has a length direction that corresponds to the length axis 8n of the shock absorber 8b and comprises in the length direction 8n an upper end 8f and an axially opposed lower end 8g. The lower end 8g is an open end via which the shock absorber rod 8d is introduced into the shock absorber tube 8c. The shock absorber rod 8d may also be referred to as a shock absorber cylinder.

According to an illustrative realization, the shock absorber tube 8c may be linked via a torque link 13 to the shock absorber rod 8d. The torque link 13 may comprise an upper torque arm 13a pivotally mounted to a torque link fixation 8k provided on the shock absorber tube 8c, preferably close to the lower end 8g of the shock absorber tube 8c. The torque link 13 may further comprise a lower torque arm 13b pivotally mounted to the upper torque arm 13a at an associated hinged connection 13c. The lower torque arm 13b may further be mounted to a torque link fixation 8l provided on the shock absorber rod 8d close to a lower end 8h of the shock absorber rod 8d. Moreover, the torque link fixation 8l and/or the lower end 8h of the shock absorber rod 8d may be connected to a wheel axle 8m of the wheel 8a.

The shock absorber rod 8d is preferably glidingly movable within the shock absorber tube 8c along the length axis 8n of the shock absorber 8b. By way of example, the shock absorber 8b is shown in an expanded state.

While the shock absorber rod 8d is movable relative to the shock absorber tube 8c, the latter is rigidly mounted via first, second, and third fixations 8p, 8e, and 8i to first, second, and third fittings 10a, 11c, and 11d provided in the at least one lower lateral fuselage compartment 2c. Preferably, the second fitting 11c and the third fitting 11d are integral parts of, i.e., incorporated into, a main fitting 11 which, thus, forms the second fitting 11c and the third fitting 11d. In other words, the second fitting 11c and the third fitting 11d preferably merely define two fitting points of the single main fitting 11.

The main fitting 11 is preferably at least rigidly attached to, or integrated into, the side shell 2e and the longeron 18, and may further be attached to, or integrated into, a first frame 19a of the fuselage 2 and/or a cabin floor 17 of the helicopter 1 of FIG. 1. Thereby, the second fitting 11c is arranged close to the longeron 18 and the third fitting 11d is arranged close to the side shell 2e.

Illustratively, the first fixation 8p is provided close to the open end 8g on the shock absorber tube 8c and connected to the first fitting 10a. Seen in the context of the helicopter 1 of FIG. 1, the first fixation 8p and the first fitting 10a are illustratively located on a front side of the main landing gear 8, i.e., oriented toward a nose region of the helicopter and, therefore, hereinafter referred to as "the front fixation 8p" and "the front fitting 10a", for simplicity and clarity. The second fixation 8e is provided close to the closed end 8f on the shock absorber tube 8c and connected to the second fitting 11c. Seen in the context of the helicopter 1 of FIG. 1, the second fixation 8e and the second fitting 11c are illustratively located on an inner side of the main landing gear 8 and, therefore, hereinafter referred to as "the inner fixation 8e" and "the inner fitting 11c", for simplicity and clarity. The third fixation 8i is provided close to the closed end 8f on the shock absorber tube 8c and connected to the third fitting 11d. Seen in the context of the helicopter 1 of FIG. 1, the third fixation 8i and the third fitting 11d are illustratively located on an outer side of the main landing gear 8 and, therefore, hereinafter referred to as "the outer fixation 8i" and "the outer fitting 11d", for simplicity and clarity.

More specifically, the inner fitting 11c and the outer fitting 11d illustratively support a supporting axle 8j which preferably interconnects the inner fixation 8e and the outer fixation 8i. The supporting axle 8j may comprise a first bearing section 11a which may be accommodated pivotally in the inner fitting 11c and which is, therefore, referred to hereinafter as "the inner bearing section 11a", for simplicity and clarity. Furthermore, the supporting axle 8j may comprise a second bearing section 11b which may be accommodated pivotally in the outer fitting 11d and which is, therefore, referred to hereinafter as "the outer bearing section 11b", for simplicity and clarity. Thus, the supporting axle 8j forms a main hinge axis (21 in FIG. 4). In other words, the inner fixation 8e and the outer fixation 8i are connected to each other via the supporting axle 8j which is connected to the inner fitting 11c and the outer fitting 11d such that the supporting axle 8j forms the main hinge axis.

By way of example, the inner fixation 8e comprises a first resp. inner mounting arm connected to the shock absorber tube 8c. For instance, the inner mounting arm may be integrally formed with the shock absorber tube 8c and comprises a bearing lug 12a that pivotally supports the supporting axle 8j. Illustratively, the inner mounting arm is at least approximately V- or L-shaped and extends from the closed end 8f of the shock absorber tube 8c laterally outward toward the bearing lug 12a, forms a kink at the bearing lug 12a and extends from there back toward the shock absorber tube 8c. By way of example, the inner mounting arm intersects the shock absorber tube 8c close to the front fixation 8p.

Similarly, the outer fixation 8i illustratively comprises a second resp. outer mounting arm connected to the shock absorber tube 8c. For instance, the outer mounting arm may be integrally formed with the shock absorber tube 8c and comprises a bearing lug 12b that pivotally supports the supporting axle 8j. Illustratively, the outer mounting arm is at least approximately V- or L-shaped and extends from the closed end 8f of the shock absorber tube 8c laterally outward toward the bearing lug 12b, forms a kink at the bearing lug 12b and extends from there back toward the shock absorber tube 8c. By way of example, the outer mounting arm intersects the shock absorber tube 8c close to the front fixation 8p.

The front fixation 8p, in turn, may be integrally formed with the shock absorber tube 8c and attached to a linear link component 10. The linear link component 10, which is together with the front fixation 8p and the front fitting 10a illustratively located on the front side of the main landing gear 8, preferably links the shock absorber tube 8c to the front fitting 10a. Accordingly, the linear link component 10 embodies a drag link and is, therefore, hereinafter referred to as "the drag link 10", for simplicity and clarity. The drag link 10 blocks rotational movement of the main landing gear 8 about the main hinge axis (21 in FIG. 4) formed by the supporting axle 8j.

Illustratively, the drag link 10 is attached to the front fixation 8p at a first fixation point 14a and to the front fitting 10a at a second fixation point 14b, preferably by means of single bolt lug connections, wherein respective bolts are shear loaded. The second fixation point 14b is illustratively close to the first frame 19a of the fuselage 2, and the front fitting 10a preferably extends from the second fixation point 14b, i.e., the first frame 19a, to a second frame 19b of the fuselage 2. By way of example, the front fitting 10a is attached to, or integrally formed with, the quarter shell 2f of the fuselage 2. The first and second frames 19a, 19b illustratively support the quarter shell 2f of the fuselage 2.

Figure 3:
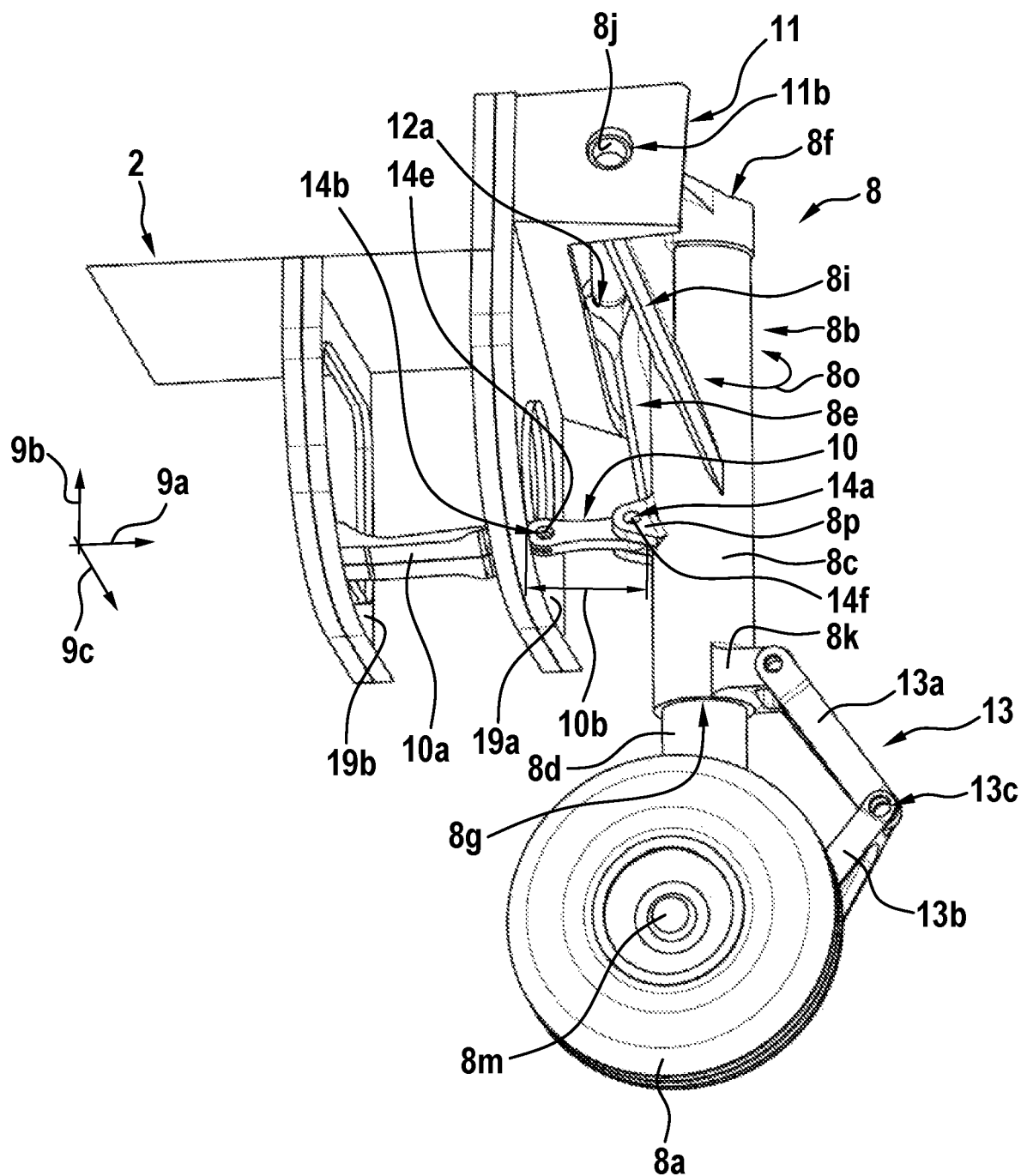
FIG. 3 shows a perspective view of parts of frames of the fuselage of FIG. 2, as well as the at least one non-retractable wheel-type landing gear of FIG. 2, seen from an outer lower side.

FIG. 3 shows the main landing gear 8 of FIG. 2 with the single wheel 8a and the shock absorber 8b, as well as a portion of the fuselage 2 of FIG. 2 with the first and second frames 19a, 19b. The main landing gear 8 is rigidly attached by means of the supporting axle 8j to the main fitting 11 of FIG. 2, and by means of the drag link 10 to the front fitting 10a of FIG. 2. Furthermore, the longitudinal direction 9a, the vertical direction 9b, and the transverse direction 9c according to FIG. 2 are indicated and applied in analogy to the main landing gear 8.

On the one hand, FIG. 3 illustrates in more detail the extension of the front fitting 10a between the second frame 19b of the fuselage 2 and the fixation point 14b which is close to the first frame 19a of the fuselage 2. On the other hand, FIG. 3 illustrates in more detail an associated length 10b of the drag link 10 formed on a geometrical connection line connecting the first and second fixation points 14a, 14b of FIG. 2.

Illustratively, the first fixation point 14a is equipped with a first spherical bearing 14e. Similarly, the second fixation point 14b is equipped with a second spherical bearing 14f.

Figure 4:
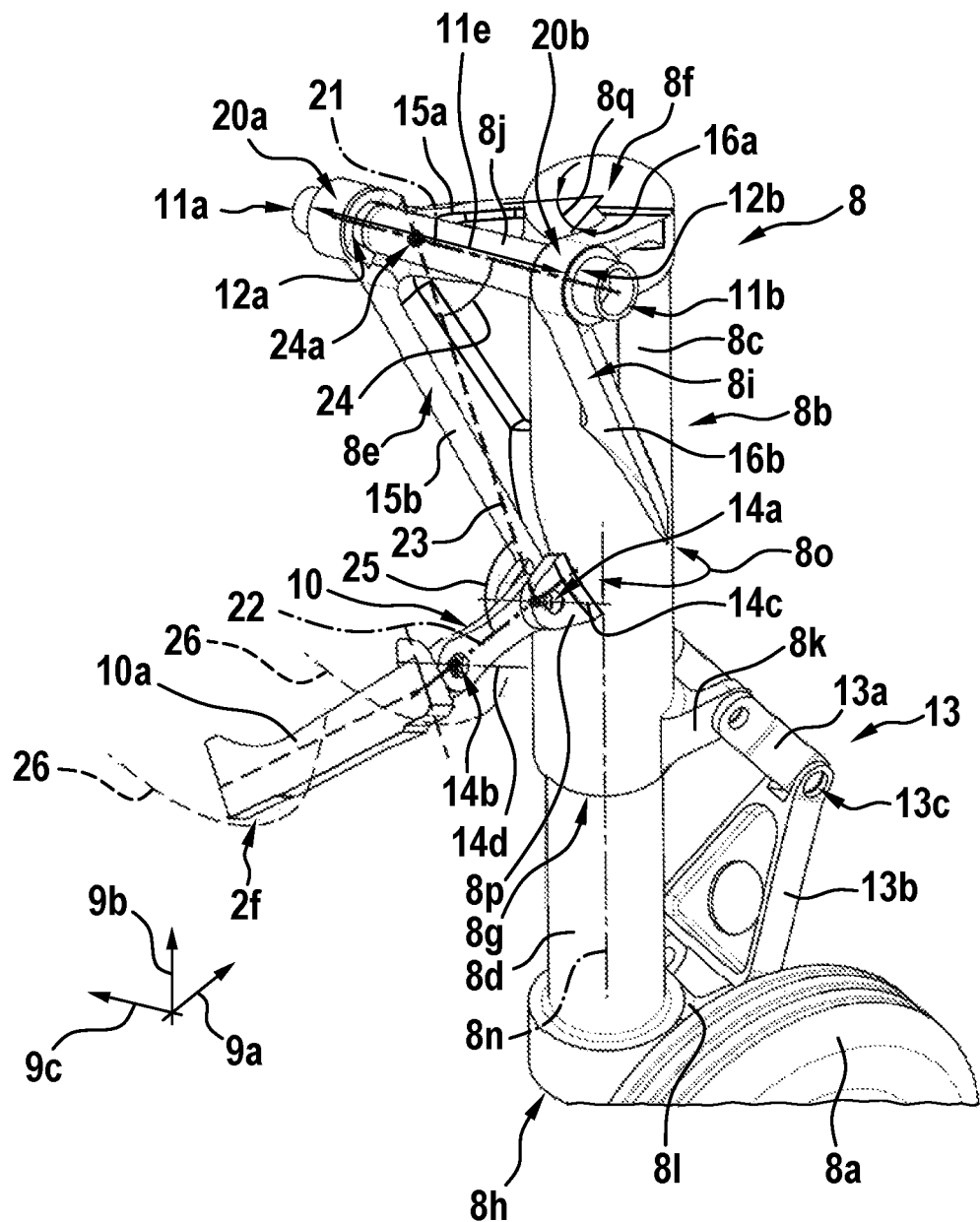
FIG. 4 shows a perspective view of the at least one non-retractable wheel-type landing gear of FIG. 2 and FIG. 3.

FIG. 4 shows the main landing gear 8 of FIG. 2 and FIG. 3 with the single wheel 8a and the shock absorber 8b having the circumferential direction 8o and comprising the shock absorber tube 8c with the closed end 8f and the open end 8g. The shock absorber tube 8b comprises the inner and outer fixations 8e, 8i, which are interconnected by the supporting axle 8j with the inner and outer bearing sections 11a, 11b, as well as the front fixation 8p which is connected to the drag link 10 of FIG. 2 and FIG. 3. Furthermore, the longitudinal direction 9a, the vertical direction 9b, and the transverse direction 9c according to FIG. 2 and FIG. 3 are indicated and applied in analogy to the main landing gear 8.

By way of example, loft lines 26 are illustrated at locations which correspond to respective positions of the frames 19a, 19b of the fuselage 2 according to FIG. 2 and FIG. 3. Furthermore, a predetermined distance 11e between the inner and outer bearing sections 11a, 11b, which corresponds to a distance between the inner and outer fittings 11c, 11d of FIG. 2 and FIG. 3, is illustrated. Preferably, the predetermined distance 11e is greater than the associated length 10b of the drag link 10 of FIG. 3.

Moreover, FIG. 4 illustrates in more detail a preferred embodiment of the inner and outer fixations 8e, 8i, in accordance with the short description at FIG. 2 above. Accordingly, the inner fixation 8e comprises the bearing lug 12a and an inner mounting arm connected to the shock absorber tube 8c, and the outer fixation 8i comprises the bearing lug 12b and an outer mounting arm connected to the shock absorber tube 8c. Preferably, the inner and outer fixations 8e, 8i and, more particularly, the bearing lugs 12a, 12b are spaced apart from each other in the circumferential direction 8o of the shock absorber 8b by a predetermined angle 8q.

More specifically, the inner mounting arm preferably comprises an upper arm section 15a and a lower arm section 15b and is illustratively integrally formed with the shock absorber tube 8c and at least approximately V- or L-shaped. By way of example, the upper arm section 15a extends from the closed end 8f of the shock absorber tube 8c laterally outward toward the bearing lug 12a, and the lower arm section 15b extends from the bearing lug 12a laterally inward toward the shock absorber tube 8c. Accordingly, the bearing lug 12a is located at an intersection 20a between the upper arm section 15a and the lower arm section 15b.

Similarly, the outer mounting arm preferably comprises an upper arm section 16a and a lower arm section 16b and is illustratively integrally formed with the shock absorber tube 8c and at least approximately V- or L-shaped. By way of example, the upper arm section 16a extends from the closed end 8f of the shock absorber tube 8c laterally outward toward the bearing lug 12b, and the lower arm section 16b extends from the bearing lug 12b laterally inward toward the shock absorber tube 8c. Accordingly, the bearing lug 12b is located at an intersection 20b between the upper arm section 16a and the lower arm section 16b.

The bearing lugs 12a, 12b are illustratively interconnected by the supporting axle 8j, which has a length axis 21 that forms a main hinge axis 21 of the main landing gear 8. Preferably, the main hinge axis 21 is connected to the front fixation 8p of the shock absorber tube 8c via at least one geometrical connecting line 23. The at least one geometrical connecting line 23 illustratively intersects the main hinge axis 21 at an associated intersection point 24a and forms a predetermined angle 24 with the main hinge axis 21. Preferably, the predetermined angle 24 amounts to 90°, i.e., the at least one geometrical connecting line 23 is preferably perpendicular to the main hinge axis 21.

Likewise, the at least one geometrical connecting line 23 illustratively forms another predetermined angle 25 with an action line 22. The action line 22 is illustratively formed by the drag link 10, i.e., geometrically located between the first and second fixation points 14a, 14b. Preferably, the other predetermined angle 25 amounts also to 90°, i.e., the action line 22 is preferably perpendicular to the at least one geometrical connecting line 23. Furthermore, the action line 22 is preferably perpendicular to the main hinge axis 21 and/or arranged tangential to the quarter shell 2f of the fuselage 2 of FIG. 2 and FIG. 3.

Illustratively, the first and second fixation points 14a, 14b form associated hinge axes. By way of example, the first fixation point 14a forms a hinge axis 14c and the second fixation point 14b forms a hinge axis 14d. Preferably, the hinge axis 14c is inclined with respect to the main hinge axis 21.

It should be noted that modifications to the above described embodiments are within the common knowledge of the person skilled in the art and, thus, also considered as being part of the present disclosure. For instance, although the at least one non-retractable wheel-type landing gear is only described in the context of a main landing gear in FIG. 2 to FIG. 4, the configuration and structure thereof may likewise be applied to the nose landing gear 7 of FIG. 1. It should further be noted that in the context of the present description the term "non-retractable wheel-type landing gear" refers to a fixed landing gear which is statically and rigidly mounted to the fuselage of a rotorcraft and which may not be entirely or even partially be retracted into an associated storage compartment during flight operation of the rotorcraft.

REFERENCE LIST 1 rotorcraft
1a multi-blade main rotor
1b, 1c rotor blades
1d rotor head
1e rotor shaft
2 fuselage
2a cabin
2b rear fuselage
2c lower lateral fuselage compartment
2d fuselage lower shell
2e fuselage side shell
2f fuselage quarter shell
2g compartment opening
3 tail boom
4 counter-torque device
4a tail rotor
5 fin
6 wheel-type landing gear
7 non-retractable nose landing gear
8 non-retractable main landing gear
8a wheel
8b shock absorber
8c shock absorber tube
8d shock absorber rod
8e shock absorber inner mounting arm
8f shock absorber tube upper end
8g shock absorber tube lower end
8h shock absorber rod lower end
8i shock absorber outer mounting arm
8j shock absorber upper supporting axle
8k shock absorber tube torque link fixation
8l shock absorber rod torque link fixation
8m wheel axle
8n shock absorber length axis
8o shock absorber circumferential direction
8p shock absorber lower fixation
8q predetermined angle
9a longitudinal direction
9b vertical direction
9c transverse direction
10 drag link
10a drag link fitting
10b drag link length
11 main fitting
11a, 11b shock absorber upper supporting axle bearing sections
11c, 11d main fitting sections
11e distance between main fitting sections resp. shock absorber upper supporting axle bearing sections
12a, 12b shock absorber upper supporting axle bearing lugs
13 torque link
13a upper torque link component
13b lower torque link component
13c torque link hinged connection
14a, 14b drag link fixation points
14c drag link inner hinge axis
14d drag link outer hinge axis
14e, 14f spherical bearings
15a upper section of inner mounting arm
15b lower section of inner mounting arm
16a upper section of outer mounting arm
16b lower section of outer mounting arm
17 cabin floor
18 longeron
19a, 19b frames
20a, 20b mounting arm intersection areas
21 length axis of upper supporting axle
22 drag link action line
23 geometrical connecting line
24 angle between length axis of upper supporting axle and connecting line
24a intersection point of length axis of upper supporting axle with connecting line
25 angle between connecting line and drag link action line
26 loft lines

What is claimed is:

1. A rotorcraft comprising:
    a fuselage forming at least one lower lateral fuselage compartment with an opening, wherein the at least one lower lateral fuselage compartment comprises at least a first fitting, a second fitting, and a third fitting; and
    at least one non-retractable wheel-type landing gear rigidly attached in the at least one lower lateral fuselage compartment and extending at least partly through the opening, wherein the at least one non-retractable wheel-type landing gear comprises:
        at least one wheel;
        a shock absorber with a length axis and a circumferential direction, the shock absorber being connected to the at least one wheel and including:

a shock absorber tube with a length direction, which comprises in the length direction an open end and an axially opposed closed end; and a shock absorber rod telescopically mounted to the shock absorber tube via the open end;

a first fixation provided close to the open end on the shock absorber tube and connected to the first fitting;

a second fixation provided close to the closed end on the shock absorber tube and connected to the second fitting; and a third fixation provided close to the closed end on the shock absorber tube and connected to the third fitting, wherein the third fixation is spaced apart from the second fixation in the circumferential direction of the shock absorber by a predetermined angle, wherein the second fixation and the third fixation are connected to each other via a supporting axle, and wherein the supporting axle is connected to the second fitting and the third fitting such that the supporting axle forms a main hinge axis; and wherein the first fixation forms a hinge axis that is inclined with respect to the main hinge axis.

2. The rotorcraft of claim 1,
wherein the at least one lower lateral fuselage compartment comprises a main fitting that forms the second fitting and the third fitting.

3. The rotorcraft of claim 1,
wherein the second fixation comprises a first mounting arm connected to the shock absorber tube, and wherein the first mounting arm is integrally formed with the shock absorber tube and comprises a first bearing lug that supports the supporting axle.

4. The rotorcraft of claim 3,
wherein the third fixation comprises a second mounting arm connected to the shock absorber tube, and wherein the second mounting arm is integrally formed with the shock absorber tube and comprises a second bearing lug that supports the supporting axle.

5. The rotorcraft of claim 1,
wherein the first fixation is integrally formed with the shock absorber tube and attached to a linear link component that links the shock absorber tube to the first fitting.

6. The rotorcraft of claim 1,
wherein the first fixation and the main hinge axis are connected via at least one geometrical connecting line that is perpendicular to the main hinge axis.

7. The rotorcraft of claim 6,
wherein the at least one geometrical connecting line intersects the main hinge axis at an associated intersection point.

8. The rotorcraft of claim 6,
wherein the first fixation is attached to a linear link component that links the shock absorber tube to the first fitting and the linear link component forms an action line that is perpendicular to the at least one geometrical connecting line.

9. The rotorcraft of claim 8,
wherein the action line is perpendicular to the main hinge axis.

10. The rotorcraft of claim 8,
wherein the fuselage comprises a side shell that transitions via a quarter shell into a lower shell, and wherein the action line is arranged tangential to the quarter shell.

11. The rotorcraft of claim 5,
wherein the linear link component has a length which is smaller than a predetermined distance between the second fitting and the third fitting.

12. The rotorcraft of claim 1,
wherein the fuselage comprises a side shell that transitions via a quarter shell into a lower shell, and wherein the first fitting is attached to, or integrally formed with, the quarter shell.

13. The rotorcraft of claim 1,
wherein the first fixation forms a first link fixation point and the first fitting forms a second link fixation point; and wherein the first link fixation point is equipped with a first spherical bearing and the second link fixation point is equipped with a second spherical bearing.

14. A rotorcraft comprising:
a fuselage forming at least one lower lateral fuselage compartment with an opening, wherein the at least one lower lateral fuselage compartment comprises at least a first fitting, a second fitting, and a third fitting; and at least one non-retractable wheel-type landing gear rigidly attached in the at least one lower lateral fuselage compartment and extending at least partly through the opening, wherein the at least one non-retractable wheel-type landing gear comprises:

at least one wheel;

a shock absorber with a length axis and a circumferential direction, the shock absorber being connected to the at least one wheel and including:

a shock absorber tube with a length direction, which comprises in the length direction an open end and an axially opposed closed end;

a shock absorber rod telescopically mounted to the shock absorber tube via the open end;

a first fixation provided close to the open end on the shock absorber tube and connected to the first fitting;

a second fixation provided close to the closed end on the shock absorber tube and connected to the second fitting; and a third fixation provided close to the closed end on the shock absorber tube and connected to the third fitting, wherein the third fixation is spaced apart from the second fixation in the circumferential direction of the shock absorber by a predetermined angle;

wherein the fuselage comprises a side shell that transitions via a quarter shell into a lower shell, and wherein the first fitting is attached to, or integrally formed with, the quarter shell.

15. The rotorcraft of claim 14,
wherein the second fixation and the third fixation are connected to each other via a supporting axle, and wherein the supporting axle is connected to the second fitting and the third fitting such that the supporting axle forms a main hinge axis.

16. The rotorcraft of claim 15,
wherein the second fixation comprises a first mounting arm connected to the shock absorber tube, and wherein the first mounting arm is integrally formed with the shock absorber tube and comprises a first bearing lug that supports the supporting axle.

17. The rotorcraft of claim 14,
wherein the first fixation has a hinge axis inclined relative to the main hinge axis.

18. A rotorcraft comprising:
a fuselage forming at least one lower lateral fuselage compartment with an opening, wherein the at least one lower lateral fuselage compartment comprises at least a first fitting, a second fitting, and a third fitting; and at least one non-retractable wheel-type landing gear rigidly attached in the at least one lower lateral fuselage compartment and extending at least partly through the opening, wherein the at least one non-retractable wheel-type landing gear comprises:

at least one wheel;

a shock absorber with a length axis and a circumferential direction, the shock absorber being connected to the at least one wheel and including:

a shock absorber tube with a length direction, which comprises in the length direction an open end and an axially opposed closed end;

a shock absorber rod telescopically mounted to the shock absorber tube via the open end;

a first fixation provided close to the open end on the shock absorber tube and connected to the first fitting;

a second fixation provided close to the closed end on the shock absorber tube and connected to the second fitting; and a third fixation provided close to the closed end on the shock absorber tube and connected to the third fitting, wherein the third fixation is spaced apart from the second fixation in the circumferential direction of the shock absorber by a predetermined angle;

wherein the first fixation forms a first link fixation point and the first fitting forms a second link fixation point; and wherein the first link fixation point is equipped with a first spherical bearing and the second link fixation point is equipped with a second spherical bearing.

19. The rotorcraft of claim 18, wherein the second fixation and the third fixation are connected to each other via a supporting axle, and wherein the supporting axle is connected to the second fitting and the third fitting such that the supporting axle forms a main hinge axis.

20. The rotorcraft of claim 19, wherein the second fixation comprises a first mounting arm connected to the shock absorber tube, and wherein the first mounting arm is integrally formed with the shock absorber tube and comprises a first bearing lug that supports the supporting axle.

\* \* \* \* \*